United States Patent [19]
Genell et al.

[11] Patent Number: 6,122,505
[45] Date of Patent: Sep. 19, 2000

[54] COMMUNICATION SYSTEM WITH BASE STATIONS HAVING TEST CAPABILITIES

[75] Inventors: Gunnar Genell, Stockholm; Arne Hermansson, Farsta, both of Sweden

[73] Assignee: Telefonaktiebolaget LM Ericsson, Stockholm, Sweden

[21] Appl. No.: 08/996,517

[22] Filed: Dec. 23, 1997

[51] Int. Cl.$^7$ ..................................................... H04Q 7/20
[52] U.S. Cl. .......................... 455/423; 455/424; 455/67.1
[58] Field of Search ................................ 455/67.1, 67.2, 455/657.3, 67.4, 423, 424, 425

[56] References Cited

U.S. PATENT DOCUMENTS

| | | | |
|---|---|---|---|
| 5,309,477 | 5/1994 | Ishii | 375/10 |
| 5,521,904 | 5/1996 | Eriksoon et al. | 370/14 |
| 5,710,980 | 1/1998 | Ueda | 455/67.4 |
| 5,768,688 | 6/1998 | Owada | 455/67.1 |
| 5,768,689 | 6/1998 | Borg | 455/67.4 |
| 5,793,749 | 8/1998 | Helwig et al. | 370/241 |
| 5,802,105 | 9/1998 | Tiedemann, Jr. et al. | 375/225 |
| 5,924,029 | 7/1999 | Sohngen et al. | 455/423 |
| 5,943,617 | 8/1999 | Nakamura | 455/423 |
| 5,978,675 | 11/1999 | Niemela | 455/424 |

FOREIGN PATENT DOCUMENTS

| | | | |
|---|---|---|---|
| WO 95/35004 | 12/1995 | WIPO | H04Q 7/36 |
| WO 96/16522 | 5/1996 | WIPO | H04Q 7/34 |

*Primary Examiner*—Edward F. Urban
*Assistant Examiner*—Tilahun Gesesse
*Attorney, Agent, or Firm*—Burns, Doane, Swecker & Mathis, L.L.P.

[57] ABSTRACT

A communication system uses its existing resources to test base stations, without requiring dedicated test equipment. The communication includes scattered base stations that in a normal operating mode, transmit communication signals to mobile stations over downlink RF channels and receive communication signals from the mobile stations over uplink RF channels. At least one base station of the communication system is responsive to a test command for placing the base station in a test mode. In the test mode, a receiver section of the testing base station receives test signals from a tested base station over a downlink RF channel for testing its transmitter path, the testing base station includes a transmitter section that in the test mode transmits test signals to the other base station over an uplink channel for testing its receiver path.

18 Claims, 3 Drawing Sheets

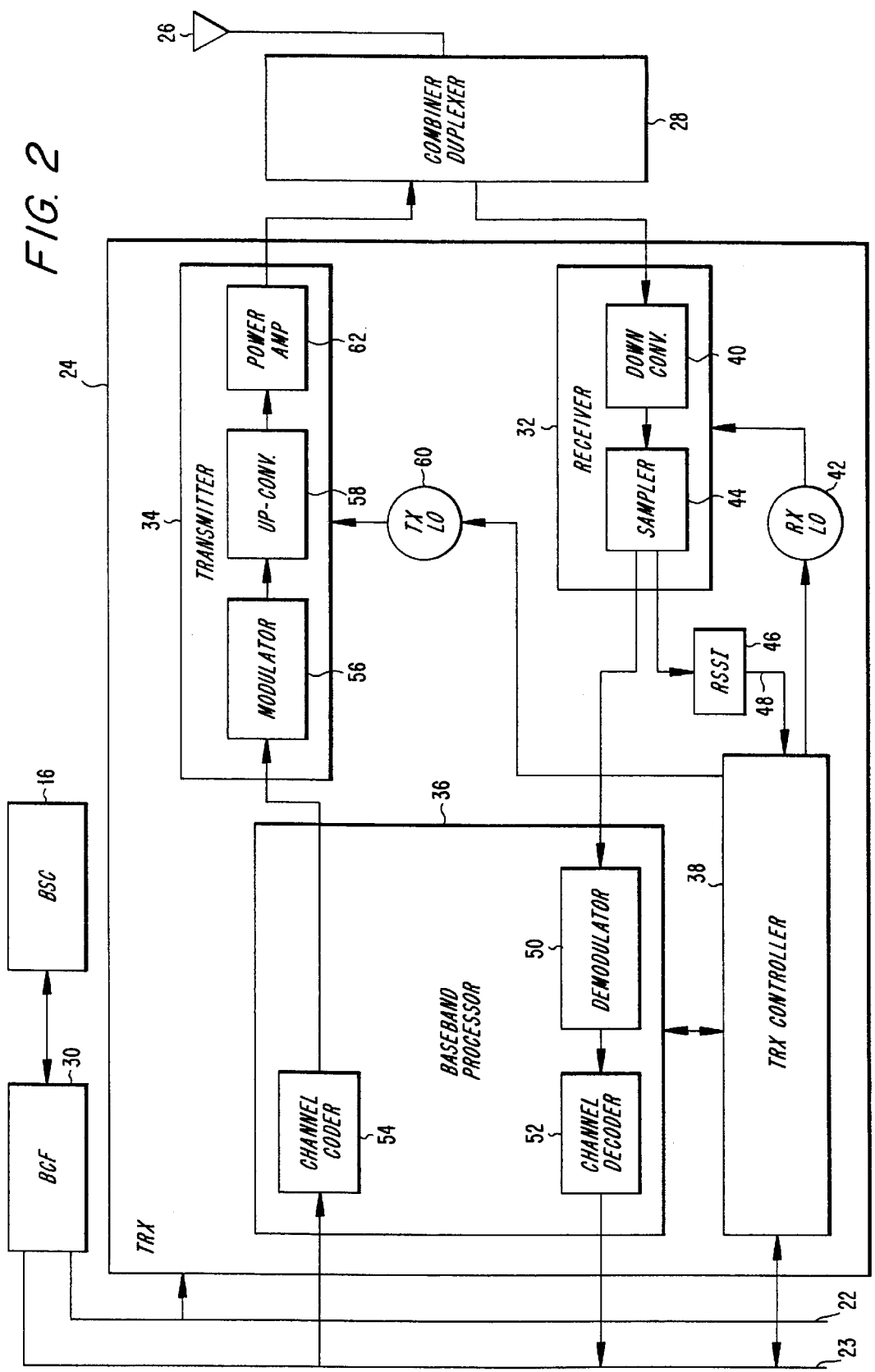

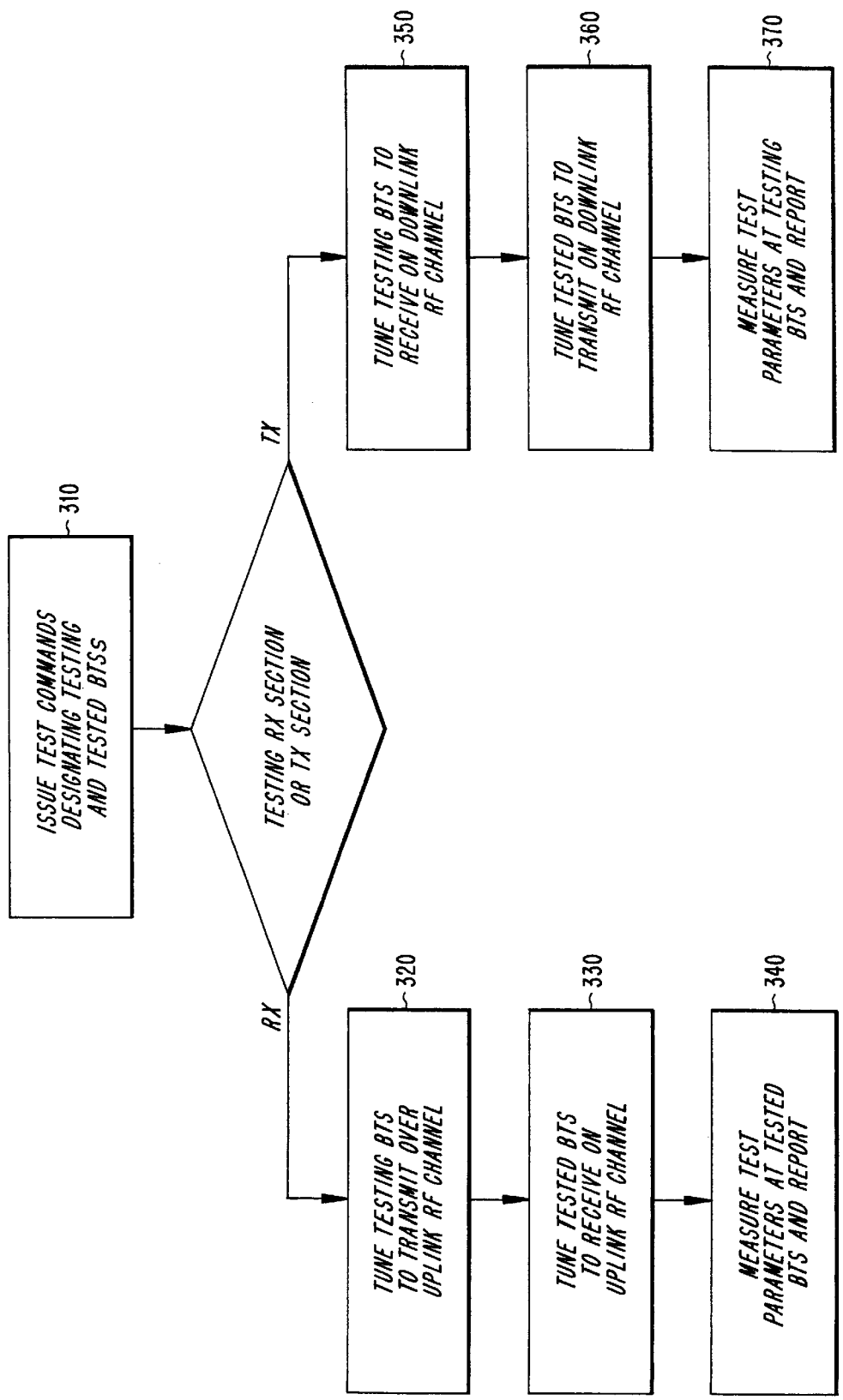

COMMUNICATION SYSTEM WITH BASE STATIONS HAVING TEST CAPABILITIES

TECHNICAL FIELD

The present invention relates to the field of communication systems, more particularly, to wireless communication systems that include scattered base stations communicating with mobile stations.

BACKGROUND

Communication systems, in general, and cellular systems, in particular, are extensively used to provide wireless communication services to a wide array of mobile subscribers. For example, European Telecommunication Standard Institute (ETSI) has specified a Global Standard for Mobile Communication (GSM) that uses time division multiple access (TDMA) to communicate control, voice and text information over radio frequency (RF) channels. In the U.S., Telecommunication Industry Association (TIA) has published a number of Interim Standards, such as IS-136, that define various versions of digital advanced mobile phone service (D-AMPS), with the capability of transmitting voice and data to subscribers. Generally, these systems include scattered base stations that communicate via corresponding transceivers with mobile stations over uplink and down link RF channels. During normal operation, the base stations transmit communication signals to the mobile stations over downlink RF channels and receive communication signals from the mobile stations over uplink RF channels. Similarly, the mobile stations include transceivers that transmit communication signals over the uplink RF channels and receive communication signals over the downlink RF channels.

Over the years, communication system operators have recognized that quality of communication over RF channels is of utmost importance. The communication quality over the RF channels is affected by the condition of various radio elements, i.e., the antenna equipment and transceivers, of the base station. Therefore, system operators regularly monitor the operating condition of their system's base stations, in order to offer their services with a satisfactory quality level. The regular monitoring of base station operating condition, which involves performing a battery of tests and measurements, is costly. As a result, the systems operators are constantly searching for ways to reduce their operating cost, without sacrificing the quality of the offered services.

Conventionally, test equipment, which are capable of establishing wireless communication with the base station for emulating communication path with mobile stations, are used to perform the test and measurements. Under one arrangement, a technician visits cell sites in order to perform manual measurements using the test equipment. The labor cost of performing the tests manually, however, is high, with such cost increasing as the size of a system and/or the number of its cell sites become larger. Therefore, less costly automated test and measurements methods are preferred, because they eliminate the need for visiting the cell sites, or, alternatively, such automated tests could allow the operator to more intelligently decide whether a site should be visited or not. Most conventional automated tests utilize costly dedicated test equipment that are incorporated in the base stations.

Another conventional automated test method known as Radio Frequency Test Loop (RFTL) provides a loop between the transmitter and receiver paths of a base station. In a test mode, RF switches connected to suitable attenuators couple the transmitter of the base station to its receiver to test base stations receiver and transmitter paths. The RFTL, however, provides for the testing of some but not all elements of the base station. For example, the RFTL method does not include base station antenna and feeder in the test loop. As a result, if an external object, which is positioned near the base station, impedes propagation of RF waves to and from the base station, or if the antenna has been damaged, the RFTL method is unable to accurately detect reception quality.

Therefore, there exists a need for a low cost test method for accurately checking the transmitting and receiving capabilities of scattered base stations of a communication system.

SUMMARY

The present invention that addresses this and other needs is embodied in a communication system that uses existing resources of the communication system to effectively test its base stations, without requiring dedicated test equipment. The communication system includes scattered base stations that in a normal operating mode, transmit communication signals to mobile stations over downlink RF channels and receive communication signals from the mobile stations over uplink RF channels. Normally, base station's transmitter frequency band is separated from its receiver frequency band by a duplex distance. A base station of the communication system respond to a test command for placing the base station in a test mode. In the test mode, a receiver section of the base station receives test signals from a tested base station over a downlink RF channel. Additionally, the base station includes a transmitter section that in the test mode transmits test signals to the tested base station over an uplink channel.

According to some of the more detailed features of the invention, the base station includes a receiver local oscillator means that tunes the receiver section. In the normal operating mode, the receiver local oscillator means tunes the receiver section to receive the communication signals over the uplink RF channel. Also, the base station includes a transmitter local oscillator means that tunes the transmitter section. In the test mode, however, the receiver local oscillator means tunes the receiver section to receive the test signals over the downlink RF channel. Preferably, the local oscillator means includes two independent receiver local oscillator elements that are switched for providing suitable receiver local oscillator signals in the normal operating mode and test mode. In the normal operating mode, the transmitter local oscillator means tunes the transmitter section to transmit the communication signals over the downlink RF channel. In the test mode, the transmitter local oscillator means tunes the transmitter section to transmit the test signals over the uplink RF channel in the normal receive frequency band. Again, the transmitter local oscillator means may include independent transmitter local oscillator elements that are switched to provide suitable transmitter local oscillator signals in the normal operating mode and test mode.

According to a method of operating the communication system according to the present invention, the base stations are operated in the normal operating mode and in the test mode. In the normal operating mode, communication signals are transmitted to the mobile stations over downlink RF channels and received from the mobile stations over uplink RF channels. In the test mode, test signals are either received from another base station over a downlink RF channel or transmitted to another base station over an uplink RF channel.

According to another aspect of the invention, a method for testing a base station comprises the steps of operating one of the base stations as a testing base station, while operating another one as a tested base station. For testing the receiver path of the tested base station, the transmitter section of the testing base station is tuned to transmit the test signals over an uplink RF channel, while the receiver section of the tested base station is tuned to receive the transmitted test signals over the normal uplink RF channel. Then, received signal quality parameter at the tested base station is measured, and the measured received signal quality parameter is reported to a central controller. For testing the transmitter path of the tested base station, the receiver section of the testing base station is tuned to receive test signals over a downlink RF channel, while the transmitter section of the tested base station is tuned to transmit test signals over the normal downlink RF channel. Then, a received signal parameter at the testing base station is measured and reported to the central controller.

Other features and advantages of the present invention will become apparent from the following description of the preferred embodiment, taken in conjunction with the accompanying drawings, which illustrate, by way of example, the principles of the invention.

BRIEF DESCRIPTION OF DRAWINGS

FIG. 2 is a block diagram of a base station used in the communication systems of FIG. 1.

FIG. 3 is a flow chart of a test method according to the present invention.

DETAILED DESCRIPTION

Figure 1:
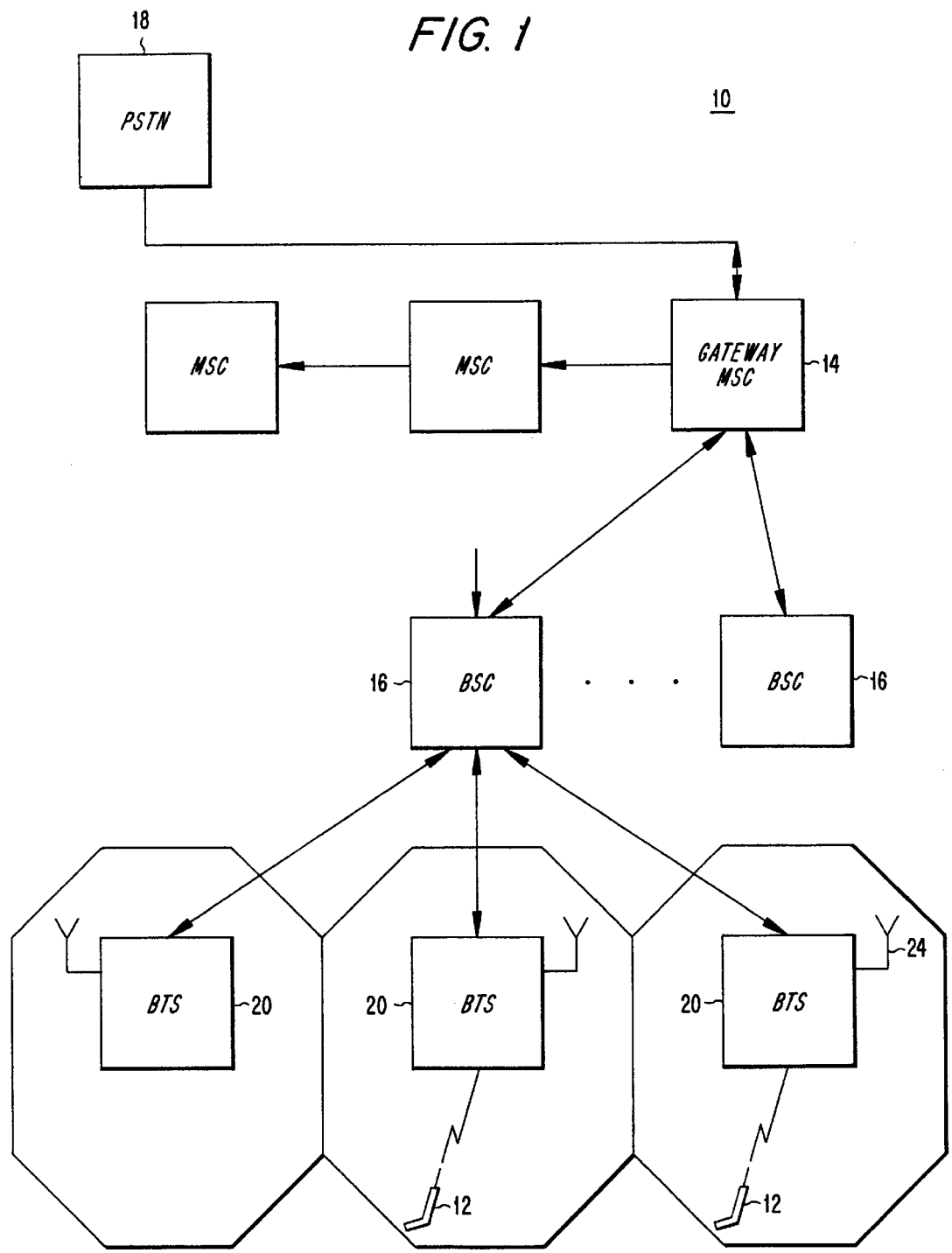
FIG. 1 is a block diagram of a communication system that advantageously incorporates the present invention.

Referring to FIG. 1, a block diagram of a communication system 10 that advantageously incorporates the present invention is shown. In an exemplary embodiment, it is assumed that the communication system 10 is a GSM communication system, that provides wireless communication capability for a plurality of mobile stations 12. The mode of operation of GSM communication systems is described in European Telecommunication Standard Institute (ETSI) documents ETS 300 573, ETS 300 574 and ETS 300 578, which are hereby incorporated by reference. Therefore, the operation of the GSM system is described to the extent necessary for understanding of the present invention. Although, the present invention is described as embodied in a GSM system, those skilled in the art would appreciate that the present invention could be used in a wide variety of other communication systems, such as those based on PDC, AMPs, or D-AMPS standards and enhancements thereof. The present invention may also be used in CDMA or a hybrid of CDMA and TDMA communication systems.

The communication system 10 covers a geographical area that is subdivided into communication cells, which together provide communication coverage to a service area, for example, an entire city. Preferably, the communication cells are patterned according to a cell pattern that allows some of the spaced apart cells to use the same uplink and downlink RF channels. In this way, the cell pattern of the system 10 reduces the number of RF channels needed to cover the service area. In communication system 10, an RF channel (uplink or downlink) is divided into repetitive time frames during which information in the form of data bursts are communicated. Each frame, which may be a super-frame or a hyper-frame, is further divided into time slots or logical channels that carry packets of information. Speech or data is transmitted during logical channels designated as traffic channels (TCH). All signaling functions pertaining to call management in the system, including call setup hand over, and call termination are handled via information transmitted over the control channels or the traffic channels.

The system 10 is designed as a hierarchical network with multiple levels for managing calls and transmission of messages. Using an allocated set of uplink and downlink RF channels, a number of mobile stations 12 operating within the system 10 participate in calls using allocated time slots that form the logical communication channels. At a higher hierarchical level, a group of Mobile Service Switching Centers (MSCs) 14 are responsible for the routing of calls from an originator to a destination. In particular, they are responsible for setup, control and termination of calls and broadcasting of messages. One of the MSCs 14, known as the gateway MSC, handles communication with a Public Switched Telephone Network (PSTN) 18, or other public and private networks.

At a lower hierarchical level, each one of the MSCs 14 are connected to a group of base station controllers (BSCs) 16. The primary function of a BSC 16 is radio resource management. For example, based on reported received signal strength at the mobile stations 12, the BSC 16 determines whether to initiate a hand over. Under the GSM standard, the BSC 16 communicates with a MSC 14 using a standard interface known as the A-interface. At a still lower hierarchical level each one of the BSCs 16 control a group of base transceiver stations (BTSs) 20. Each BTS 20 includes at least one TRX that uses the uplink and downlink RF channels to serve a particular common geographical area. Therefore, a BTS 20 primarily provides the RF links for the transmission and reception of data bursts within a designated cell.

According to the present invention, the BTS 20 is capable of operating in one of two modes: a normal operating mode and a test mode. In the normal operating mode, the BTS 20 transmits data bursts over an allocated downlink RF channel and receives data bursts over an allocated uplink RF channel. Similarly, the mobile stations 12 transmit data bursts to the BTS 20 over the allocated uplink RF channel and receive data bursts from the BTS 20 over the allocated downlink channel. These uplink and corresponding downlink channels are separated in frequency by the duplex distance as is well known in the art. In the preferred embodiment of the invention, the BTS 20 is placed in the test mode in response to a test command issued by the MSC 14. Alternatively, the BTS 20 may be placed in the test mode by a test command issued by another BTS 20, which may broadcast the test command using the control channels. For testing the receiver path, a tested BTS, operating in the normal operating mode, receives test signals transmitted from a testing BTS 20, preferably, a neighboring BTS 20, over an uplink RF channel. The tested BTS 20 then reports the results of its reception to the BSC 16. For testing the transmitter path, the tested BTS 20 transmits test signals to the testing BTS 20 over a downlink RF channel, with the testing base station reporting its reception results to the BSC 16. The BSC 16 then routes the test results to the MSC 14 for further processing, which may include comparisons with various test thresholds. In this way, the communication system 10 uses its own resources to test the receive and transmit capabilities of the BTSs 20, thereby reducing operating cost to the operator. At the same time, the receive and transmit capabilities of the testing BTSs 20, when working in the test mode are also verified.

Referring to FIG. 2, an exemplary block diagram of the BTS 20 that operates according to the present invention is shown. Through a timing bus 22, the BTS 20 is synchronized with other BTSs 20 within the communication system 10. Voice and data information are provided to and from the BTS 20 through a traffic bus 23 that may be coupled, through an A-bis interface, to a public or private voice and data transmission line, such as a T1 line (not shown). The BTS 20 includes a TRX 24 that communicate with the mobile stations 12 and other BTSs 20 over the RF channels through an antenna 26. The TRX 24 is coupled to the antenna 26 through a combiner/duplexer 28 that combines transmission signals and distributes received signals in a well known manner. The BTS 20 also includes a base station common function (BCF) block 30 that controls the operation and maintenance of the BTS 20.

The TRX 24 includes a receiver section 32, a transmitter section 34, a baseband processor 36, and a TRX controller 38. In the normal operating mode, the receiver section 32 receives uplink signals from the mobile stations 12 through the antenna 36. A down-conversion block 40 down-converts the received signal. The down conversion block 40 is coupled to a receiver local oscillator means (RxLO) 42, which tunes the receiver section to receive signals at a particular frequency of an RF channel, for example, uplink RF channel or downlink RF channel. In the normal operating mode, RxLO 42, under the control of the TRX controller 38, tunes the receiver section 32 to receive normal communication signals, such as voice or data messages, over the uplink RF channel. In the test mode, however, RxLO 42 of a testing BTS 20 tunes the receiver section 32 to receive test signals on the downlink RF channel, to allow for the testing of another base station's transmitter path. In an exemplary embodiment, the RxLO 42 may include independent local oscillator elements that are switched to provide suitable receiver local oscillator signals in the normal operating mode and test mode. It will be readily understood that the combiner/duplexer 28 must also be reconfigured in order to operate in the test mode.

After down-converting the received signals, either test or communication signals, the receiver section 32 samples its phase and magnitude, via a sampler block 44, to provide received bit sequences to the baseband processor 36. An RSSI estimator 46 provides an RSSI signal on line 48, which is a measure of the received signal strength. The RSSI estimator 46 may also measure noise disturbance levels during idle channels. The TRX controller 38, which is coupled to the traffic bus 23, processes the commands, such as test commands that are received from the BSC 16 and transmits TRX related information, such as various TRX measurements, to the BSC 16. In the normal operating mode, the TRX controller 38 periodically reports the RSSI signal and noise disturbance levels to the BSC 16. In the test mode, the TRX controllers 38 reports received signal quality test measurements to the BSC, while the test is in progress.

The baseband processor 36 includes a demodulator 50 that receives uplink baseband data from the receiver section 32. The demodulator 50 generates correlator responses that are processed in a well known manner to retrieve the uplink baseband data. The demodulator 50 may support demodulation of signals that are modulated using a predefined scheme. The uplink baseband data is applied to a channel decoder 52 that decodes the baseband signal according to one or more supported channel decoding schemes. In a well known manner, the channel decoder 52 also provides an indication of reception quality in terms of bit error rate (BER). The channel decoder 52 places the decoded baseband signal on the traffic bus 23, for further processing by the BSC 16.

When transmitting downlink baseband data in the normal operating mode, the baseband processor 36 receives properly coded data or digitized speech information from the BSC 16 over the traffic bus 23 and applies them to a channel coder 54 that codes and inter-leaves speech and data according to a supported channel coding scheme. The transmitter section 34 includes a modulator 56 that modulates the supplied data bits according to a predefined scheme. The modulator 56 provides downlink baseband signals to an up-conversion block 58 for up-conversion. The up conversion block is coupled to a transmitter local oscillator means (TxLO) 60, which under the control of the TRX controller 38, tunes the transmitter section 34 to transmit signals over various RF channels. In the normal operating mode, TxLO tunes the transmitter section 34 to transmit communication signals over the downlink RF channel. For testing another base station's receiver in the normal mode, TxLO 60 of a testing BTS 20 tunes the transmitter section 34 to transmit test signals over the uplink RF channel. Again, in an exemplary embodiment, the TxLO 60 may include independent transmitter local oscillator elements that are switched to provide suitable transmitter local oscillator signals in the normal operating mode and test mode. A power amplifier 62 amplifies the up-converted signal for transmission through the corresponding antenna 26.

Referring to FIG. 3, a flow chart depicting the operational steps of the present invention for testing BTSs 20 in the communication system 10 is shown. First, the MSC 14 issues test commands to at least two BTSs 20 designating one as the testing BTS and the other as the tested BTS, block 310. The test commands issued by the MSC 14 are routed to the BSC 16, which communicates them to the BTSs 20 over the traffic bus 23. For testing the receiver section 32 of the tested BTS 20, the TRX controller 38 of the testing BTS 20 tunes its transmitter section 34 to transmit test signals over the uplink RF channel, block 320. Concurrently, the TRX controller 38 of the tested BTS 20 tunes its receiver section 32 to receive the transmitted signals over the normal uplink channel, block 330. The test signal is transmitted at a power level that provides an accurate measurement of reception quality parameters, such as RSSI, at the receiver section 32 of the tested BTS 20. The test signal may also be modulated with a predefined bit sequence for providing an accurate measure of BER. The measured test parameters at the tested BTS 20 are reported to the BSC 16 over the traffic bus 23, for further processing, block 340. For testing the transmitter section of the tested BTS 20, the TRX controller 38 of the testing BTS tunes its receiver section 32 to receive on the downlink channel, block 350. At the same time, the TRX controller 38 of the tested BTS 20 tunes its transmitter section 34 to transmit over the normal downlink channel, block 360. This time, the measured test parameters at the testing BTS 20, including measured RSSI and/or BER, are reported to the BSC 16 via traffic bus 23, for further processing, block 370.

From the foregoing description, it will be appreciated that the present invention provides for testing of base stations using the communication systems's available resources, without the need for dedicated test equipment. Because the test performed includes all elements of the base station, including antenna 26, test results are more reliable than those using the RFTL method. The test method of the invention can be implemented to be performed automatically by issuing test command at predefined intervals or on a as needed basis, thereby avoiding unnecessary visits to cell cites.

Although the invention has been described in detail with reference only to a preferred embodiment, those skilled in the art will appreciate that various modifications can be made without departing from the invention. Accordingly, the invention is defined only by the following claims which are intended to embrace all equivalents thereof.

What is claimed is:

1. In a communication system that includes scattered base stations that in a normal operating mode transmit communication signals to mobile stations over downlink RF channels and receive communication signals from the mobile stations over uplink RF channels, wherein the uplink and downlink RF channels are separated from each other by a predetermined frequency distance, a base station comprising:

means for responding to test commands for placing the base station in a test mode; and a receiver section that in the normal operating mode, is tuned to receive normal communication signals over an uplink RF channel and in the test mode is tuned to receive test signals transmitted by a tested base station over one of said downlink RF channels.

2. The base station of claim 1 further including a receiver local oscillator means that tunes the receiver section.

3. The base station of claim 1, wherein the receiver local oscillator means includes a first local oscillator element corresponding to the uplink RF channels and a second local oscillator element corresponding to the downlink RF channels.

4. The base station of claim 1 further including a transmitter section that in the test mode transmits test signals to another base station over an uplink channel.

5. The base station of claim 4 further including a transmitter local oscillator means that tunes the transmitter section, wherein the transmitter local oscillator tunes the transmitter section to transmit the communication signals over a downlink RF channel in the normal operating mode and tunes the transmitter section in response to said test commands to transmit the test signals over an uplink RF channel in the test mode.

6. The base station of claim 5, wherein the receiver local oscillator means includes a first local oscillator element corresponding to the uplink RF channels and a second local oscillator element corresponding to the downlink RF channels.

7. The base station of claim 1, wherein the test commands are issued by a central controller.

8. The base station of claim 1, wherein the test commands are issued by another base station.

9. In a communication system that includes scattered base stations that in a normal operating mode transmit communication signals to mobile stations over downlink RF channels and receive communication signals from the mobile stations over uplink RF channels, wherein the uplink and downlink RF channels are separated from each other by a predetermined frequency distance, a method for operating a base station of the communication system comprising the steps of:

placing at least one base station in one of a normal operating mode or a test mode;

in the normal operating mode, tunning a receiver for receiving normal communication signals over an uplink RF channel; and in the test mode, tuning the receiver for receiving test signals transmitted from at least one tested base station over one of said downlink RF channels.

10. The method of claim 9, wherein the step of tuning the receive includes the step of tuning a receiver local oscillator means.

11. The method of claim 9 further including the step of transmitting test signals on an uplink channel in the test mode.

12. The method of claim 11, wherein the step of transmitting test signals includes the step of tuning a transmitter local oscillator means, which is tuned for transmitting communication signals over a downlink RF channel in the normal operating mode and is tuned for transmitting test signals over the uplink RF channel in the test mode.

13. A method for operating a communication system that includes scattered base stations that communicate with mobile stations over downlink and uplink RF channels comprising the steps of:

operating the base stations in a normal operating mode and in a test mode;

in the normal operating mode, transmitting communication signals to mobile stations over said downlink RF channels and receiving communication signals from the mobile stations over said uplink RF channels; and in the test mode, receiving test signals transmitted from a tested base station over a one of said downlink RF channels.

14. The method of claim 13, wherein the step of receiving test signals includes the step of tuning a receiver local oscillator means, which is tuned for receiving the communication signals over an uplink RF channel in the normal operating mode and for receiving the test signals over the downlink channel in the test mode.

15. The method of claim 13 further including the step of transmitting test signals to a tested base station over an uplink channel in the test mode.

16. The method of claim 15, wherein the step of transmitting test signals includes the step of tuning a transmitter local oscillator means, which is tuned for transmitting communication signals over a downlink RF channel in the normal operating mode, and for transmitting test signals over the uplink RF channel in the test mode.

17. In a communication system that includes at least two base stations that in a normal operating mode are tuned to transmit communication signals to mobile stations over down link RF channels and receive communication signals from the mobile stations over uplink RF channels, wherein the uplink and downlink channels are separated from each other by a predetermined frequency distance, a method for testing a base station comprising the steps of:

operating one of the at least two base stations as a testing base station;

operating the other one of the at least two base stations as a tested base station;

tuning a transmitter section of the testing base station to transmit test signals over one of said uplink RF channels;

tuning a receiver section of the tested base station to receive the transmitted test signals over the one of said uplink RF channels;

measuring a receiver signal quality parameter at the tested base station; and reporting the measured received signal quality parameter to a central controller.

18. The method of claim 17 further including the steps of:

tuning a transmitter section of the tested base station to transmit test signals over a downlink RF channel;

tuning a receiver section of the testing base station to receive the transmitted test signal over the downlink RF channel;

measuring a receiver signal quality parameter at the testing base station; and reporting the measured received signal parameter to the central controller.

* * * * *